(12) United States Patent
Collins

(10) Patent No.: US 6,227,364 B1
(45) Date of Patent: May 8, 2001

(54) DISC PACKAGE WITH RETAINMENT SECTION

(76) Inventor: William Collins, 30 Durham Rd., New Hyde Park, NY (US) 00040

( * ) Notice: Subject to any disclaimer, the term of this patent is extended or adjusted under 35 U.S.C. 154(b) by 0 days.

(21) Appl. No.: 09/289,834

(22) Filed: Nov. 24, 1998

Related U.S. Application Data

(63) Continuation-in-part of application No. 09/034,135, filed on Feb. 27, 1998, now Pat. No. 5,957,281, which is a continuation-in-part of application No. 08/576,497, filed on Dec. 21, 1995, now Pat. No. 5,749,463, which is a continuation-in-part of application No. 08/607,647, filed on Feb. 27, 1996, now Pat. No. 5,769,216.

(51) Int. Cl.$^7$ .................................................. B65D 85/57
(52) U.S. Cl. ....................................... 206/312; 206/308.1
(58) Field of Search ............................... 706/308.1, 309, 706/312, 313

(56) References Cited

U.S. PATENT DOCUMENTS

| | | |
|---|---|---|
| 774,037 | 11/1904 | Bürgi . |
| 2,189,076 | 2/1940 | Liskin . |
| 2,471,173 | 5/1949 | Taylor . |
| 2,827,223 | 3/1958 | Allison ................................. 206/312 |
| 3,112,858 | 12/1963 | Ullger ................................... 206/313 |
| 3,245,691 | 4/1966 | Gorman . |
| 3,595,383 | 7/1971 | Boylan . |
| 4,355,718 * | 10/1982 | Hagelberg ............................ 206/312 |
| 4,488,645 | 12/1984 | Yamaguchi . |
| 4,566,590 | 1/1986 | Manning et al. . |
| 4,653,639 | 3/1987 | Traynor ............................. 206/308.3 |
| 4,805,770 | 2/1989 | Grobecker et al. . |
| 4,850,731 | 7/1989 | Youngs . |
| 5,048,681 | 9/1991 | Henkel . |
| 5,085,318 | 2/1992 | Leverick . |
| 5,101,973 | 4/1992 | Martinez . |
| 5,147,036 | 9/1992 | Jacobs . |
| 5,154,284 | 10/1992 | Starkey . |
| 5,188,229 | 2/1993 | Bernstein . |
| 5,207,717 | 5/1993 | Manning . |
| 5,248,032 | 9/1993 | Sheu et al. ......................... 206/308.1 |
| 5,255,785 | 10/1993 | Mackey .............................. 206/308.3 |
| 5,289,918 | 3/1994 | Dobias et al. . |
| 5,291,990 | 3/1994 | Sejzer . |
| 5,333,728 | 8/1994 | O'Brien et al. . |
| 5,396,987 | 3/1995 | Temple et al. . |
| 5,419,433 | 5/1995 | Harrer et al. . |
| 5,422,875 | 6/1995 | Bribach . |
| 5,460,265 | 10/1995 | Kiolbasa ............................ 206/308.1 |
| 5,506,740 | 4/1996 | Harmon ............................. 206/308.3 |
| 5,522,500 * | 6/1996 | Mori .................................... 206/308.1 |
| 5,732,818 * | 3/1998 | Koehn ................................ 206/308.1 |
| 5,749,463 * | 5/1998 | Collins ............................... 206/308.1 |
| 5,833,063 * | 11/1998 | Ho ...................................... 206/308.1 |

FOREIGN PATENT DOCUMENTS

| | | | |
|---|---|---|---|
| 705829 * | 5/1966 | (IT) ........................................ 206/312 |
| 5-213387 | 8/1993 | (JP) ..................................... 206/308.1 |
| 8702565A | 5/1989 | (NL) . |
| 94/22742 | 10/1992 | (WO) .................................... 206/309 |

* cited by examiner

*Primary Examiner*—Bryon P. Gehman
(74) *Attorney, Agent, or Firm*—Frishauf, Holtz, Goodman, Langer & Chick, P.C.

(57) ABSTRACT

A disc package for retaining a disc includes a retention panel having a first surface in substantial contact with a face of the disc when the disc is inserted within the package, and a cover panel which is contiguous with the retention panel and which shares with the retention panel a common edge. The common edge includes a fold line about which the cover panel is folded so as to be substantially superposed with the retention panel. The disc package also includes a disc retainment section positioned proximate a second edge of the retention panel and overlaying at least a portion of the first surface of the retention panel. At least a portion of the disc retainment section is attached to the first surface of the retention panel to enable at least a portion of the disc to be positioned between the retention panel and the engagement section to retain the disc in the disc package.

7 Claims, 7 Drawing Sheets

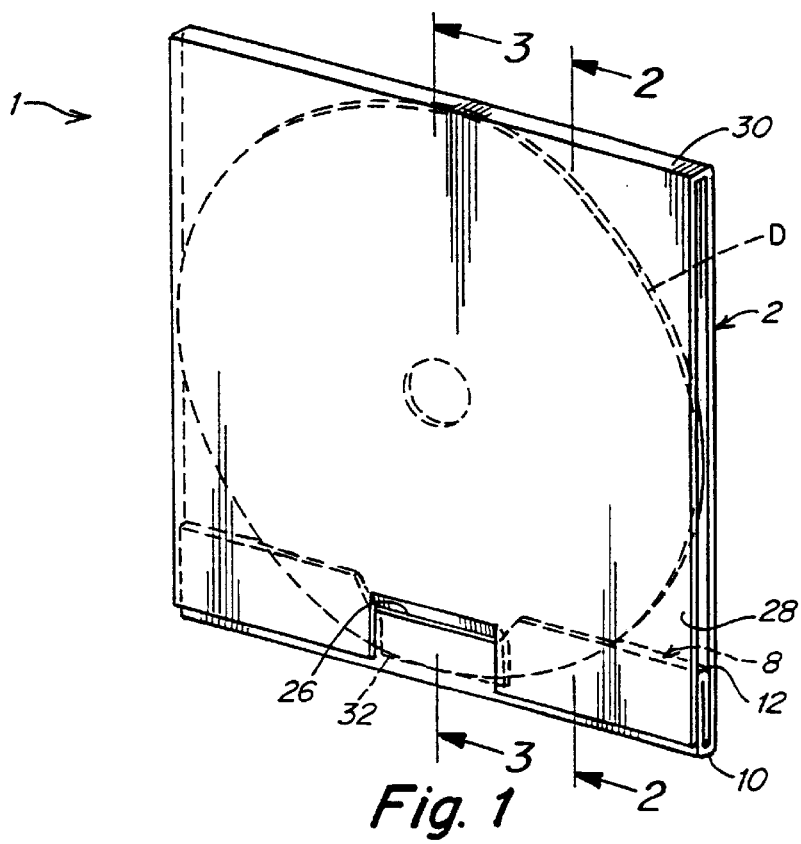
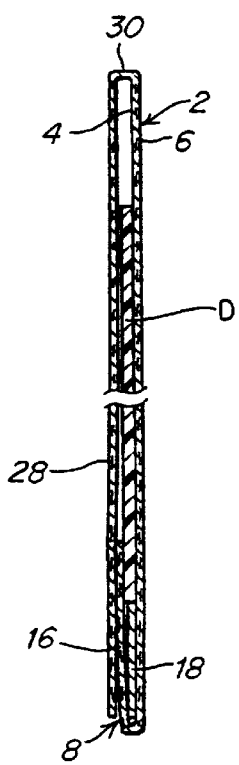
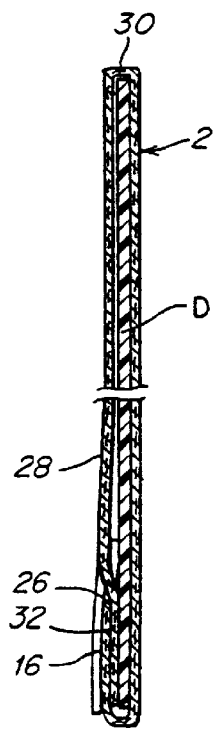
Fig. 1
Fig. 2
Fig. 3

US 6,227,364 B1

DISC PACKAGE WITH RETAINMENT SECTION

CROSS REFERENCE TO RELATED APPLICATIONS

The present application is a Continuation-In-Part (CIP) of U.S. patent application Ser. No. 09/034,135 filed Feb. 27, 1998 (now U.S. Pat. No. 5,957,281), which is a CIP of U.S. patent application Ser. Nos. 08/576,497 filed Dec. 21, 1995 (now U.S. Pat. No. 5,749,463) and Ser. No. 08/607,647 filed Feb. 27, 1996 (now U.S. Pat. No. 5,769,216), the disclosure of each application is incorporated herein by reference.

FIELD OF THE INVENTION

The present invention relates to a package, such as a holder or mailer for securely storing and transporting a compact disc (CD), computer floppy disc and the like, without scratching or marring the playing surface of the disc and for permitting the rapid insertion and removal of the disc.

BACKGROUND OF THE INVENTION

Devices for retaining a compact disc or a computer floppy disc have traditionally been constructed at least partially of plastic, and to include paperboard sleeves which obscure all or a significant portion of the disc label. These conventional compact disc holders have the drawback of not being capable of being manufactured substantially entirely by a machine.

U.S. Pat. No. 5,289,918 to Dobias et al. recognized the need for a compact disc holder which exposes the non-playing surface of the disc while the disc is in the holder. Dobias et al. further recognized the need to construct the disc holder of recyclable materials (for example, paperboard) rather than plastic, and to automate the fabrication process to reduce the manual labor involved in manufacturing and the corresponding production cost.

As a proposed solution, Dobias et al. disclose a folded container constructed from a single, unitary sheet that includes a panel having two sloped surfaces each with an elliptical cutout. The elliptical cutouts are shaped so that the larger of two arcs of each ellipse is of a sufficient height and size to permit a compact disc to easily drop through at the top of the arc, which is also at the top of the sloped surface, while the descending portion of the same arc decreases in size to snap in to lock the disc in place. The smaller of the two arcs of each ellipse is sufficient to support the disc along its edge without touching a face of the disc. As a result, the panel locks the disc at four points along its outer edge.

It is desirable to form a compact disc holder starting from a single, unitary sheet of paperboard which is initially flat and then folded in a particular manner to permit full view of the disc label while the package is open, and which does not pinch the disc at four points along its outer edge, and which prevents the disc from inadvertently popping out of its retention position.

SUMMARY OF THE INVENTION

The present invention overcomes the described drawbacks and provides a new and unique holder for compact and computer discs which can be made of paperboard or similar materials using conventional folding equipment such as that used in carton making, and manufactured in an economically environmentally friendly manner (that is, with a reduced amount of material).

In accordance with one form of the present invention, the disc package for retaining a disc includes a retention panel defining a plane having first and second surfaces wherein the first surface of the retention panel is in substantial contact with a face of the disc when the disc is inserted within the disc package. The disc package also includes a cover panel contiguous with the retention panel and sharing with the retention panel a common edge corresponding to a first edge of the retention panel. The common edge has a fold line for folding the cover panel into substantial superposition with the retention panel to cover at least a portion of the disc retained in the disc package. The disc package also includes disc retainment section positioned proximate a second edge of the retention panel opposite the first edge and superposed with respect to a portion of the first surface of the retention panel. At least a portion of the disc retainment section is unattached to the first surface of the retention panel to enable at least a portion of the disc to be positioned between the retention panel and the disc retainment section.

In accordance with another form of a present invention, the disc package for retaining a disc includes a retention panel defining a plane having first and second surfaces wherein the first surface is in substantial contact with a face of the disc when the disc is inserted within the disc package. The disc package also includes a first folded sidewall section extending from a first side of the retention panel and having a first contour edge substantially conforming to the periphery of the disc. The disc package also includes a second folded sidewall section extending from a second side of the retention panel and having a second contour edge substantially conforming to the periphery of the disc. The disc package further includes a third folded sidewall section extending from a third side of the retention panel and having at least a portion thereof which is unattached to the first surface of the retention panel to enable at least a portion of the disc to be interposed between the retention panel and the third folded sidewall section.

A preferred form of the compact disc holder, as well as other embodiments, objects, features and advantages of the invention, will be apparent from the following detailed description of illustrative embodiments thereof, which is to be read in connection with the accompanying drawings.

BRIEF DESCRIPTION OF THE DRAWINGS

FIG. 1 is a perspective view of a compact disc holder of the present invention shown in its folded, assembled condition having a compact disk secured therein and a cover panel in a closed position;

FIG. 2 is a sectional view of FIG. 1 taken along line 2—2;

FIG. 3 is a sectional view of FIG. 1 taken along line 3—3;

DETAILED DESCRIPTION OF THE PREFERRED EMBODIMENT

Figure 4:
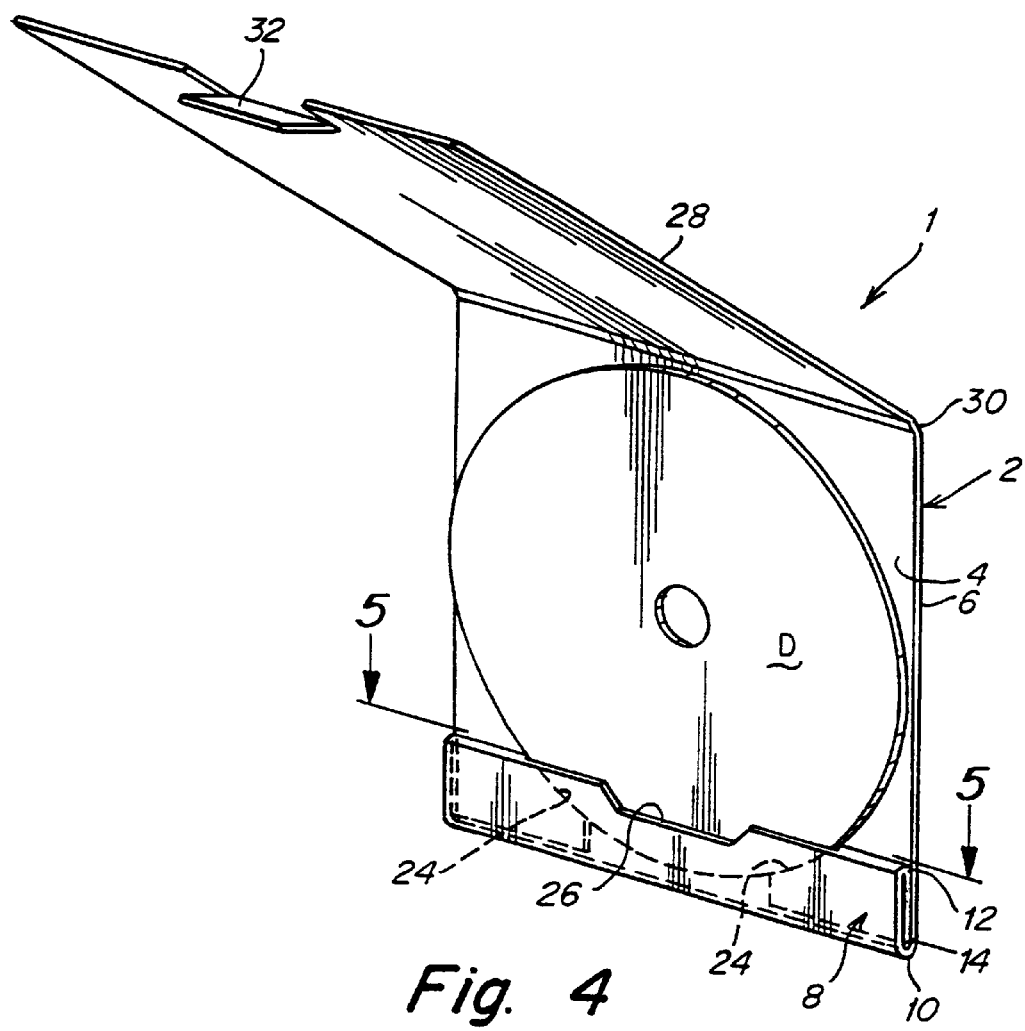
FIG. 4 is a perspective view of FIG. 1 with the top cover in an open position.
Figure 5:
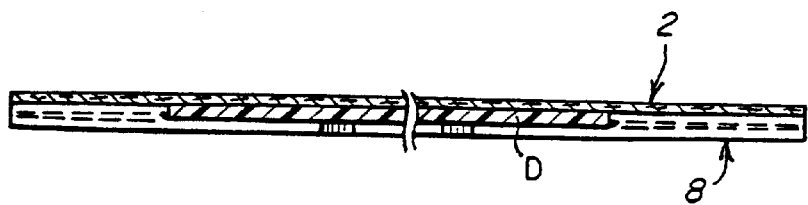
FIG. 5 is a sectional view of FIG. 4 taken along line 5—5.
Figure 6:
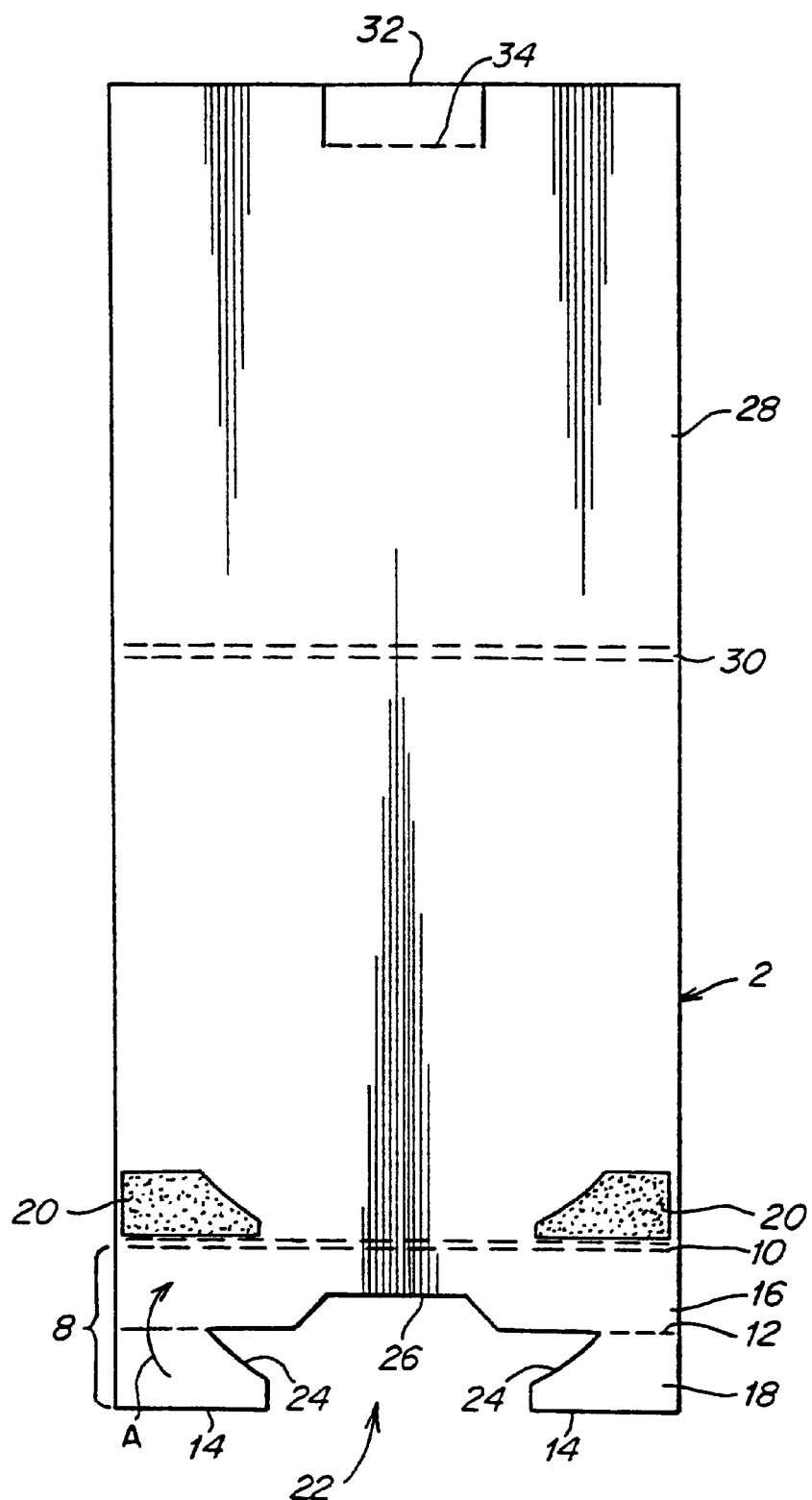
FIG. 6 is a plan view of the compact disk holder of FIG. 1 in an open pre-folded condition showing the disc retention panel and cover panel.

Referring initially to FIGS. 1 through 6 of the drawings, a preferred form of the compact disc holder 1 constructed in accordance with the present invention will now be described. FIG. 1 shows the holder in a folded closed condition, FIG. 4 shows the holder in a folded open condition, and FIG. 6 shows the holder in an unfolded condition. The holder is preferably made of paperboard or other material that can be scored and folded using conventional cardboard carton making machinery. It is foreseen, however, that other materials which are cost effective, light weight and foldable can be utilized.

Throughout the following description, the term compact disc (CD) is generally used. However, it should be clear that the invention is equally applicable to other discs, such as computer floppy discs, digital video discs (DVD), and the like. The description with respect to "compact discs" should not be deemed to be limiting of the present invention. In the claims, the more general term "disc" is used to encompass not only compact discs, but any disc.

As shown in FIGS. 1 through 6, the compact disc holder 1 comprises a retention panel 2 which is substantially preferably square having opposite first and second surfaces 4, 6. The disc holder also includes a disc retainment section 8. The disc retainment section is preferably proximate a bottom edge of the retention panel 2 and formed from material which is contiguous therewith. The disc retainment section is preferably formed by creating a first fold line (or spine) 10 along a common edge between the retention panel 2 and the disc retainment section 8. The disc retainment section also includes a fold line (or spine) 12 approximately mid-way between the first fold line and the distal edge 14 of the disc retainment section to form first and second portions 16, 18 (see FIG. 6). The second portion 18 of the disc retainment section is thereafter rotated about the fold line 12 (arrow A in FIG. 6) and onto the first portion 16 of the disc retainment section. Thereafter, the first portion 16, having the second portion rotated thereon, is rotated about the fold line 10. As a result of the folding about fold lines 10 and 12, the second portion 18 is interposed between the retention panel 2 and the first portion 16. The second portion is the secured to the retention panel using, for example, an adhesive 20. While it is preferred for manufacturing purposes that the disc retainment section 8 be contiguous with the retention panel 2, it is foreseen that the disc retainment section may be formed from material which is not contiguous with the retention panel 2. It is also foreseen that the first and second portions 16, 18 may not be contiguous with one another and that each portion 16, 18 is individually formed and secured to the package to form the disc retainment section.

Preferably, the disc retainment section 8 is cut from a single sheet to the shape shown in FIG. 6 during a stamping or cutting process wherein the entire paperboard layout which forms the holder is cut during a single machine operation. Therefore during manufacturing, a cutout 22 having a boat-like outline as shown in FIG. 6 is removed therefrom. The contoured cut of the disc retainment section serves at least two purposes. First, the curved cut 24 is designed to conform to the periphery of the disc D being retained in the disc package and to engage the periphery of the disc D for lateral retention of the disc. The trapezoidal cut 26 is designed for easy insertion of the cover panel locking tab and to engage the cover panel flap (described in detail below) to secure the cover panel to the disc retainment section.

The disc package 1 also includes a cover panel 28 which is preferably contiguous with the retention panel 2 and which shares with the retention panel a common edge. The common edge includes a fold line 30 (or spine) for folding the cover panel over and in substantial superposition with the retention panel. The cover panel also includes a locking tab 32 which, when the cover panel is folded in a substantially superposed position with the retention panel, engages the disc engagement section for securing the cover panel in superposition with the retention panel. More specifically, the locking tab is designed to be rotated about fold line 34 so that it can be interposed between the retention panel and the disc retainment section for serving the cover panel.

As a result of the present invention, when a disc D is inserted in the disc package as shown in FIG. 5, a disc is laterally retained within the disc package by engagement with the contoured edges of the curve cuts 24 of the disc retention panel and the spine about which the cover panel rotates. The disc D is therefore securely maintained in the disc retainment package.

Figure 7:
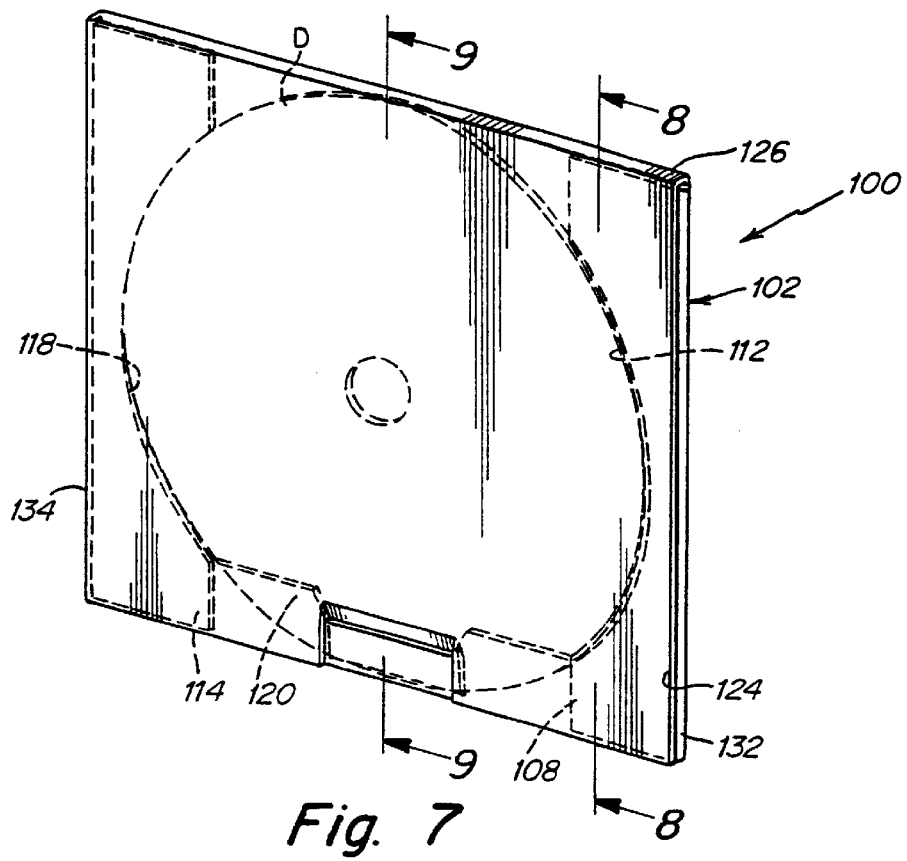
FIG. 7 is an perspective view of an alternative embodiment of the present invention wherein the compact disc holder includes folded sidewall sections and a cover panel in a closed position.
Figure 8:
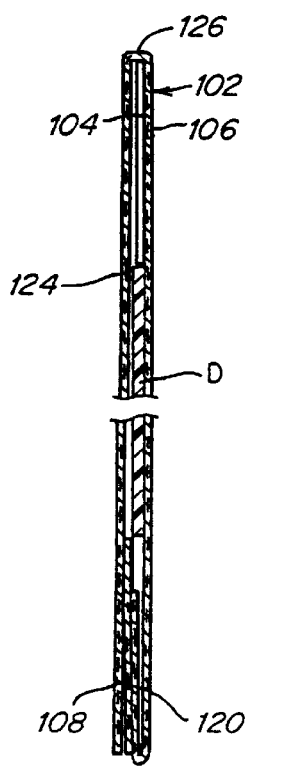
FIG. 8 is a sectional view of FIG. 7 taken along line 8—8 with the cover panel closed.
Figure 9:
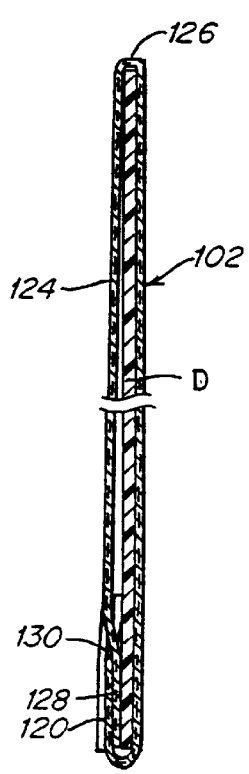
FIG. 9 is a sectional view of FIG. 7 taken along line 9—9 with the cover panel closed.
Figure 10:
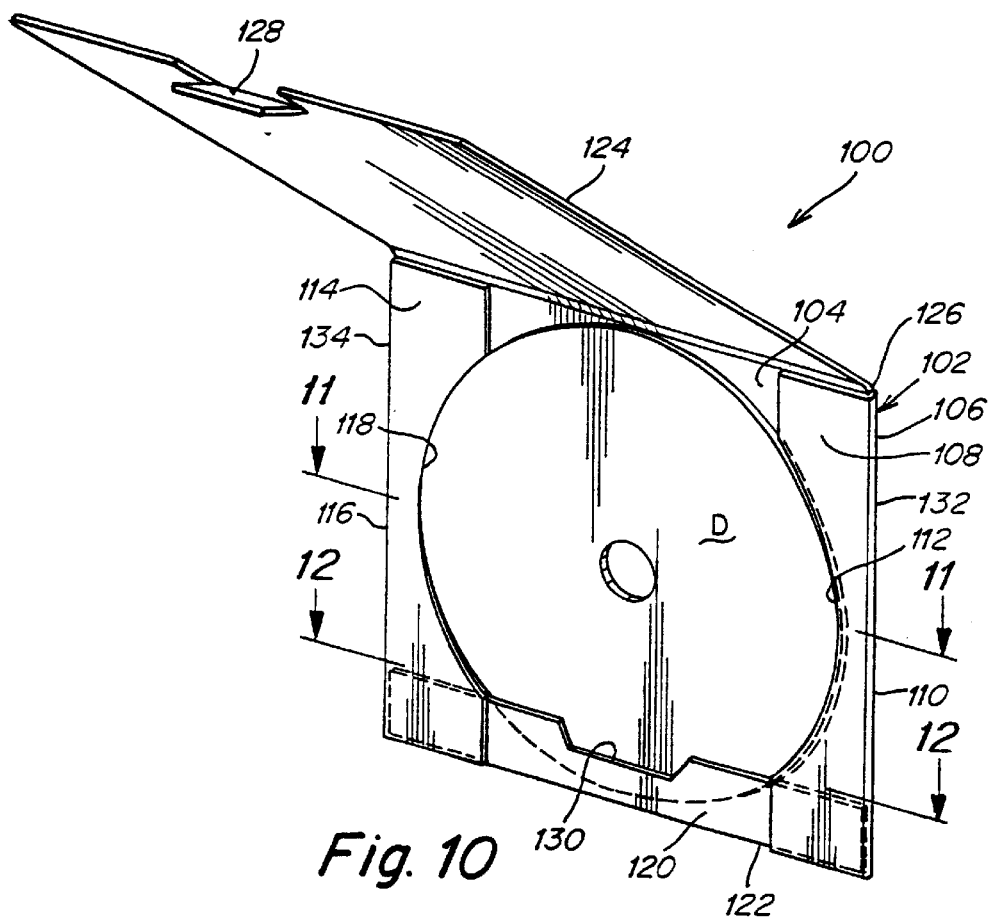
FIG. 10 is a Perspective view of FIG. 7 with the top cover in an upon position.
Figure 11:
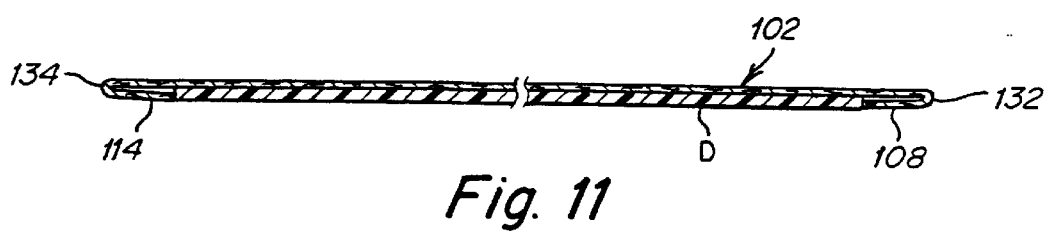
FIG. 11 is a sectional view of FIG. 10 taken along line 11—11.
Figure 12:
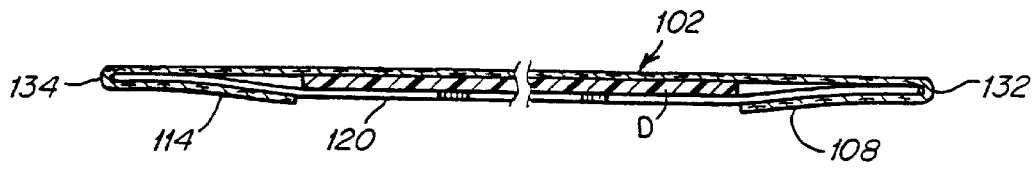
FIG. 12 is a sectional view of FIG. 10 taken along line 12—12.
Figure 13:
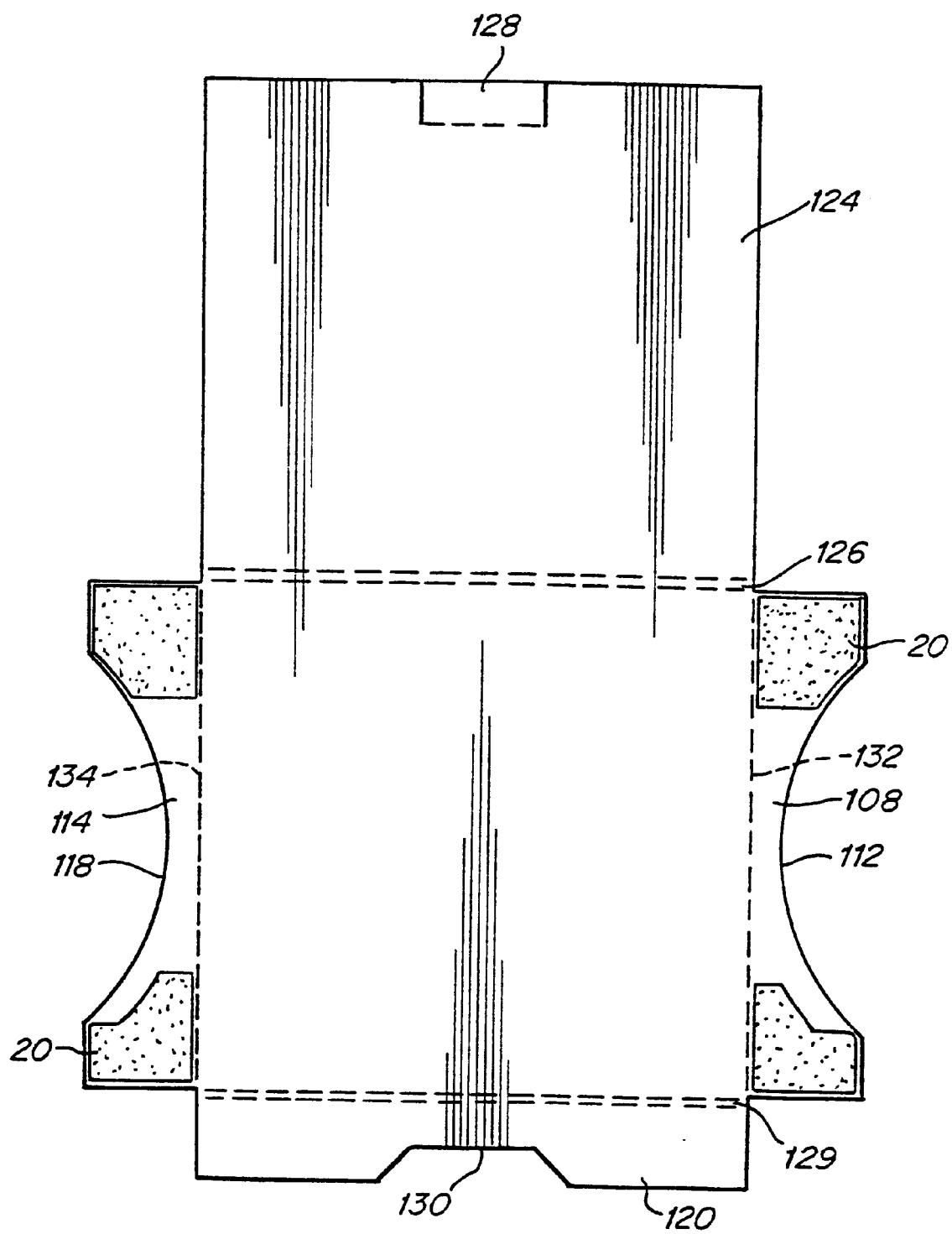
FIG. 13 is a plan view of the compact disc holder of FIG. 7 in an open pre-folded condition showing the folded sidewall sections, retention panel and cover panel.
Figure 14:
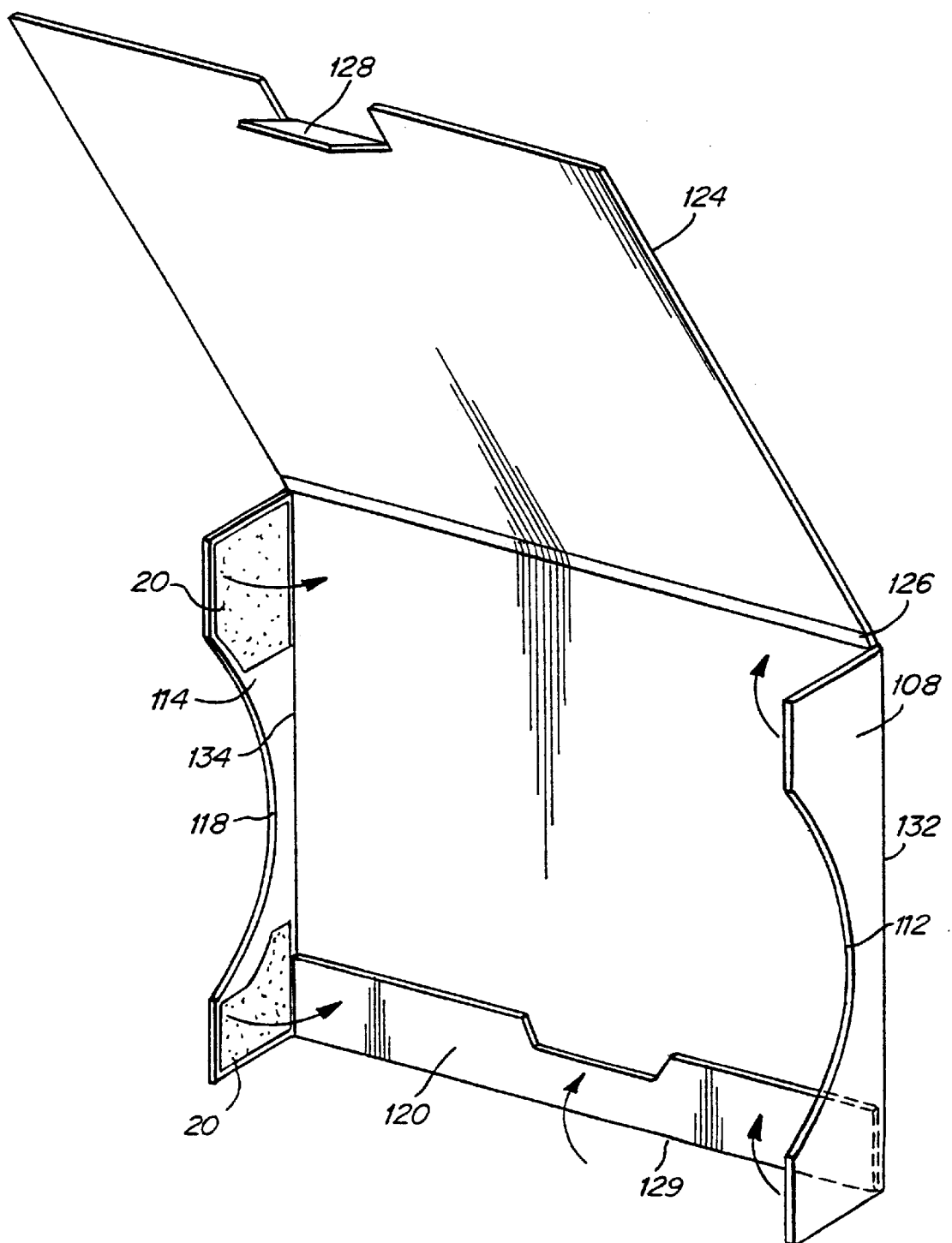
FIG. 14 is a perspective view of the compact disc holder of FIG. 13 showing the folding of the folded sidewall sections upon the retention panel.

Referring now to FIGS. 7–14 of the drawings, an alternative form of the disc holder constructed in accordance with the present invention will now be described. FIG. 7 shows the holder in a folded, closed condition, and FIGS. 13 and 14 show the holder in an open, unfolded condition and an open, partially folded condition, respectively. The holder is preferably made of paperboard or other material that can be scored and folded using conventional cardboard carton making machinery.

As shown in FIGS. 7–14, the disc holder 100 includes a retention panel 102 which is substantially preferably square having opposite first and second surfaces 104, 106 wherein the first surface of the retention panel is in substantial contact with a face of the disc when the disc is inserted within the disc package. The disc holder also includes a first folded sidewall section 108 extending from a first edge 110 of the retention panel. The first folded sidewall section includes a first contour edge 112 which substantially conforms to a portion of the periphery of the disc which is to be inserted in a disc package. The disc package also includes a second folded sidewall section 114 extending from a second edge 116 of the retention panel. Preferably, the second edge 116 of the retention panel is opposite the first edge 110 of the retention panel. The second folded sidewall section includes a second contour edge 118 which substantially conforms to a portion of the periphery of the disc D which is to be inserted in the package.

The disc holder 100 includes a third folded sidewall section 120 extending from a third edge 122 of the retention panel 102. The holder also includes a cover panel 124 which is preferably contiguous with the retention panel 102 and shares with the retention panel a common edge. The common edge includes a fold line 126 (or spine) for folding (rotating) the cover panel into substantial superposition with the retention panel. The cover panel preferably includes a locking tab 128 which engages a cutout portion 130 of the third folded sidewall section for securing the cover panel in superposition with the retention panel.

In the preferred embodiment, the first, second and third folded sidewall sections 108, 114, 120 are contiguous with the retention panel 102 (that is, the holder is formed from a single sheet). Each folded sidewall section preferably shares a common edge with the retention panel such that a fold line is formed for folding the folded sidewall sections into at least partial superposition with the retention panel. In the preferred embodiment, the first, second and third folded sidewall sections 108, 114, 120 comprise a single layer of paperboard. In addition, the first and second contour edges 112, 118 of the first and second folded sidewall sections are in spaced apart relation a sufficient distance to frictionally engage a disc when the disc is inserted in the holder.

The disc retainment package of the alternative embodiment is preferably constructed from the panel shown in FIG. 13 by rotating the third folded sidewall section 120 about the score line 126 so that the third folded sidewall section overlays a portion of the retention panel 102. In the preferred embodiment, the third folded sidewall section is not secured (that is, glued) to the retention panel to enable the disc to be interposed between the retention panel and the third folded sidewall section. However, it is foreseen that the edges of the third retention panel can be secured by glue or similar means to the retention panel.

After rotation of the third folded sidewall section 120, the first and second folded sidewall sections 108, 114 are rotated about their respective fold lines (spines) 132, 134. The lower outer edge of the first and second folded sidewall sections are preferably secured to the third folded sidewall section as shown in FIG. 14. In addition, the upper end of the first and second folded sidewall sections are secured to the first surface 104 of the retention panel 120. As a result, a pocket is formed beneath the third folded sidewall section for retention of a disc.

The first and second folded sidewall sections are preferably secured using an adhesive 20 of sufficient strength to maintain the first and second folded sidewall sections 108, 114 and the third folded sidewall section 120 in a folded condition. In lieu of an adhesive, other forms of fasting may be employed such as stapling or engageable hook and loop material. However, adhesive is the preferred method of securement.

Having described the disc holder 100 structure, the operation and use of the disc holder will now be described. A disc D is preferably inserted in the holder by placing an edge of the disc D under the third folded sidewall section 120. Thereafter, the side of the disc opposite the portion which is under the third folded sidewall section is placed in substantial contact with the retention panel 102 (see FIG. 10). As the disc D is placed in contact with the retention panel, the first and second contoured edges 112, 118 of the first and second folded sidewall sections substantially frictionally engage the peripheral edge of the disc. Due to the curvature of the first and second folded sidewall sections and the placement of the disc under the third folded sidewall section 120, the disc is laterally and vertically retained in the disc package even without use of the cover panel while having the surface of the disc visible. However, when the cover panel 124 is secured to the third folded sidewall section, the disc is secured against all movement from the disc package.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A disc package comprising:
   a retention panel defining a plane having first and second surfaces, the first surface of said retention panel being in substantial contact with a face of a disc when the disc is inserted within said disc package;
   a cover panel being contiguous with said retention panel and sharing with said retention panel a common edge corresponding to a first edge of said retention panel, said common edge having a fold line for folding the cover panel into substantial superposition with said retention panel, said cover panel covering at least a portion of the disc when the disc is inserted within said disc package; and
   a disc retainment section proximate a second edge of the retention panel and superposed with respect to a portion of the first surface of the retention panel, at least a portion of the disc retainment section being unattached to the first surface of the retention panel to enable a portion of the disc to be positioned between the retention panel and the disc retainment section wherein the disc retainment section includes at least first and second layers, the second layer being interposed between the first layer and the retention panel,
   wherein the second layer includes a contoured edge which substantially conforms to the Periphery of the disc for engaging at least a Dortion of the periphery of the disc.

2. The disc package as defined by claim 1, wherein the disc retainment section is contiguous with the retention panel.

3. The disc package as defined by claim 2, wherein the disc retainment section shares at least a portion of a common edge with the second edge of the retention panel, said common edge having a fold line for folding the disc retainment section so as to overlay said retention panel first surface.

4. The disc package as defined by claim 1 wherein the cover panel further comprises a locking tab which engages said disc retainment section for securing the cover panel in superposition with the retention panel.

5. A disc package for retaining a disc comprising:
   a retention panel defining a plane having first and second surfaces, the first surface of said retention panel being in substantial contact with a face of a disc when the disc is inserted within said disc package; and
   a disc retainment section proximate an edge of the retention panel and superposed with respect to a portion of the first surface of the retention panel, at least a portion of the disc retainment section being unattached to the first surface of the retention panel to enable a portion of the disc to be positioned between the retention panel and the disc retainment section, wherein the disc retainment section includes at least first and second layers, the second layer being interposed between the first layer and the retention panel,
   wherein the second layer includes a contoured edge which substantially conforms to the periphery of the disc for engaging at least a portion of the periphery of the disc.

6. The disc package as defined by claim 5, wherein the disc retainment section is contiguous with the retention panel.

7. The disc package as defined by claim 6, wherein the disc retainment section shares at least a portion of a common edge with the edge of the retention panel, said common edge having a fold line for folding the disc retainment section so as to overlay said retention panel first surface.

* * * * *

UNITED STATES PATENT AND TRADEMARK OFFICE
CERTIFICATE OF CORRECTION

PATENT NO. : 6,227,364 B1
DATED : May 8, 2001
INVENTOR(S) : William Collins

Page 1 of 1

It is certified that error appears in the above-identified patent and that said Letters Patent is hereby corrected as shown below:

<u>Title page,</u>
Item [56], References Cited, U.S. PATENT DOCUMENTS, insert
-- 5,772,022    6/1998        Renna........................206/312 --.

Signed and Sealed this

Twelfth Day of March, 2002

*Attest:*

*Attesting Officer*

JAMES E. ROGAN
*Director of the United States Patent and Trademark Office*